United States Patent
Kim et al.

(10) Patent No.: US 11,064,233 B2
(45) Date of Patent: Jul. 13, 2021

(54) PROVIDING SERVICE RECOMMENDATION INFORMATION ON THE BASIS OF A DEVICE USE HISTORY

(71) Applicant: SAMSUNG ELECTRONICS CO., LTD., Suwon-si (KR)

(72) Inventors: Sung-won Kim, Seongnam-si (KR); Do-sung Kim, Hwaseong-si (KR); Mu-gong Bae, Suwon-si (KR); Hyun-don Yoon, Pohang-si (KR); Bong-seok Lee, Suwon-si (KR); Hee-ran Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/633,045

(22) PCT Filed: Jul. 19, 2018

(86) PCT No.: PCT/KR2018/008157
§ 371 (c)(1),
(2) Date: Jan. 22, 2020

(87) PCT Pub. No.: WO2019/027160
PCT Pub. Date: Feb. 7, 2019

(65) Prior Publication Data
US 2020/0175398 A1 Jun. 4, 2020

(30) Foreign Application Priority Data

Aug. 1, 2017 (KR) .................. 10-2017-0097828

(51) Int. Cl.
*H04N 21/258* (2011.01)
*H04L 29/08* (2006.01)

(52) U.S. Cl.
CPC ....... *H04N 21/25891* (2013.01); *H04L 67/22* (2013.01); *H04N 21/25841* (2013.01)

(58) Field of Classification Search
CPC ......... H04L 67/00; H04L 67/22; H04N 21/00; H04N 21/20; H04N 21/25; H04N 21/251;
(Continued)

(56) References Cited

U.S. PATENT DOCUMENTS 6,564,381 B1 * 5/2003 Hodge ............... H04N 7/17336
348/E5.008
7,581,237 B1 * 8/2009 Kurapati .............. H04N 21/454
725/46

(Continued)

FOREIGN PATENT DOCUMENTS

JP 5477297 4/2014
JP 5997794 9/2016
(Continued)

OTHER PUBLICATIONS

International Search Report dated Nov. 13, 2018, in corresponding International Patent Application No. PCT/KR2018/008157.
(Continued)

*Primary Examiner* — Boris D Grijalva Lobos
(74) *Attorney, Agent, or Firm* — Staas & Halsey LLP

(57) ABSTRACT

The present disclosure relates to an artificial intelligence (AI) system utilizing machine learning algorithms and to an application thereof, and discloses an electronic device. The electronic device comprises: a memory for saving history information corresponding to the day and/or time for each of a plurality of services provided by the electronic device; and a processor for giving a weight to a piece of history corresponding to the day and/or time of an occurred event and selecting a recommended service from among the
(Continued)

plurality of services on the basis of the piece of history given the weight, when a predetermined event occurs.

15 Claims, 10 Drawing Sheets

(58) Field of Classification Search
CPC ........... H04N 21/258; H04N 21/25808; H04N 21/25841; H04N 21/262; H04N 21/26291; H04N 21/40
See application file for complete search history.

(56) References Cited

U.S. PATENT DOCUMENTS

| | | | |
|---|---|---|---|
| 8,488,500 | B2 | 7/2013 | Mukherjee et al. |
| 8,650,138 | B2 | 2/2014 | Momma et al. |
| 8,732,737 | B1* | 5/2014 | Kalmes .............. H04N 21/25883 725/14 |
| 8,799,936 | B2 | 8/2014 | Choi |
| 9,313,551 | B2* | 4/2016 | Funk .................... H04N 21/432 |
| 10,242,098 | B2* | 3/2019 | Koenigstein ........... G06F 16/639 |
| 10,445,304 | B1* | 10/2019 | Thompson .......... H04N 21/4532 |
| 2003/0097186 | A1 | 5/2003 | Gutta et al. |
| 2006/0156326 | A1* | 7/2006 | Goronzy ........... H04N 21/25891 725/13 |
| 2008/0134248 | A1* | 6/2008 | Matsuda ............. H04N 21/4668 725/46 |
| 2009/0164516 | A1* | 6/2009 | Svendsen .............. G06F 16/489 |
| 2010/0017455 | A1* | 1/2010 | Svendsen .............. H04W 4/029 709/202 |
| 2010/0100618 | A1* | 4/2010 | Kuhlke ................... H04L 67/22 709/224 |
| 2010/0146530 | A1* | 6/2010 | Bolyukh ........... H04N 21/23892 725/14 |
| 2011/0093337 | A1* | 4/2011 | Granit ................ G06Q 30/0269 705/14.53 |
| 2012/0192214 | A1* | 7/2012 | Hunn ................ H04N 21/25891 725/9 |
| 2013/0297611 | A1* | 11/2013 | Moritz ................... H04H 60/46 707/737 |
| 2014/0074653 | A1* | 3/2014 | Wang ................. G06Q 30/0631 705/26.7 |
| 2014/0215506 | A1* | 7/2014 | Kalmes .............. H04N 21/4524 725/14 |
| 2015/0052554 | A1* | 2/2015 | Iyengar .............. G06Q 30/0205 725/35 |
| 2015/0082330 | A1* | 3/2015 | Yun .................. H04N 21/26603 725/14 |
| 2015/0120722 | A1* | 4/2015 | Martin Martinez et al. ................ G06F 16/9535 707/733 |
| 2016/0057247 | A1* | 2/2016 | Song ....................... H04L 67/22 709/217 |
| 2016/0088365 | A1* | 3/2016 | Yabu .................. H04N 21/4316 725/14 |
| 2016/0188728 | A1* | 6/2016 | Gill ........................ G06F 16/955 707/727 |
| 2016/0234553 | A1* | 8/2016 | Hampson ........... H04N 21/4667 |
| 2016/0234555 | A1* | 8/2016 | Kaya ................. H04N 21/4756 |
| 2016/0364094 | A1 | 12/2016 | Shin et al. |
| 2017/0034649 | A1* | 2/2017 | Dotan-Cohen ........ G06Q 10/10 |
| 2017/0169330 | A1* | 6/2017 | Cui ......................... G06N 3/084 |
| 2017/0195731 | A1* | 7/2017 | Girlando ............ H04N 21/4668 |
| 2017/0230694 | A1* | 8/2017 | Shaw ................. H04N 21/6582 |
| 2018/0338180 | A1* | 11/2018 | Sahu .................... H04N 21/454 |
| 2018/0349800 | A1* | 12/2018 | Saba ...................... H04L 67/22 |

FOREIGN PATENT DOCUMENTS

| | | |
|---|---|---|
| KR | 10-2004-0054772 | 6/2004 |
| KR | 10-2004-0083797 | 10/2004 |
| KR | 10-0497428 | 7/2005 |
| KR | 10-2012-0003362 | 1/2012 |
| KR | 10-2013-0098841 | 9/2013 |
| KR | 10-2014-0077761 | 6/2014 |
| KR | 10-1438764 | 9/2014 |
| KR | 10-2016-0064234 | 6/2016 |
| KR | 10-2016-0064448 | 6/2016 |
| KR | 10-2016-0145351 | 12/2016 |
| WO | WO 2013/126589 | 8/2013 |

OTHER PUBLICATIONS

Written Opinion of the International Searching Authority dated Nov. 13, 2018, in corresponding International Patent Application No. PCT/KR2018/008157.

Turrin Roberto et al., "Time-based TV programs prediction", 2014. p. 1-7.

Jinoh Oh et al., "Time-dependent User Profiling for TV Recommendation", 2012 Second International Conference on Cloud and Green Computing, pp. 783-787.

* cited by examiner

FIG. 2

| Time<br>Day | 1 | ... | 17 | 18 | 19 | 20 | 21 | 22 | 23 | 24 |
|---|---|---|---|---|---|---|---|---|---|---|
| 2017-07-24 (Mon) | | | | | ESP# | ESP# | | | Golf | |
| 2017-07-25 (Tue) | | | CB# | | | ESP# | | | | |
| 2017-07-26 (Wed) | | | CB# | | | TN# | | | | |
| 2017-07-27 (Thur) | | | CB# | | | TN# | | | | |
| 2017-07-28 (Fri) | | | | | | ESP# | | | | |
| 2017-07-29 (Sat) | | | | | | FO# | | CB# | | |
| 2017-07-30 (Sun) | | | | ESP# | | | | | | |

FIG. 7

| WEAK DAY-OF-THE-WEEK PATTERN STRONG TIME PATTERN (30:5:1) | INTERMEDIATE DAY-OF-THE-WEEK PATTERN STRONG TIME PATTERN (30:10:1) | STRONG DAY-OF-THE-WEEK PATTERN STRONG TIME PATTERN (30:15:1) |
|---|---|---|
| WEAK DAY-OF-THE-WEEK PATTERN INTERMEDIATE TIME PATTERN (20:5:1) | INTERMEDIATE DAY-OF-THE-WEEK PATTERN INTERMEDIATE TIME PATTERN (20:10:1) | STRONG DAY-OF-THE-WEEK PATTERN INTERMEDIATE TIME PATTERN (20:15:1) |
| WEAK DAY-OF-THE-WEEK PATTERN WEAK TIME PATTERN (10:5:1) | INTERMEDIATE DAY-OF-THE-WEEK PATTERN WEAK TIME PATTERN (10:10:1) | STRONG DAY-OF-THE-WEEK PATTERN WEAK TIME PATTERN (10:15:1) |

PROVIDING SERVICE RECOMMENDATION INFORMATION ON THE BASIS OF A DEVICE USE HISTORY

CROSS-REFERENCE TO RELATED APPLICATIONS

THIS APPLICATION IS A U.S. NATIONAL STAGE APPLICATION WHICH CLAIMS THE BENEFIT UNDER 35 U.S.C. § 371 OF INTERNATIONAL PATENT APPLICATION NO. PCT/KR2018/008157 FILED ON Jul. 19, 2018, WHICH CLAIMS FOREIGN PRIORITY BENEFIT UNDER 35 U.S.C. § 119 OF KOREAN PATENT APPLICATION NO. 10-2017-0097828 FILED ON Aug. 1, 2017, IN THE KOREAN INTELLECTUAL PROPERTY OFFICE, THE CONTENTS OF BOTH OF WHICH ARE INCORPORATED HEREIN BY REFERENCE.

TECHNICAL FIELD

Apparatuses and methods consistent with the disclosure relate to an electronic device and a method for controlling the same, and more particularly, to an electronic device capable of providing service recommendation information on the basis of a device use history, and a method for controlling the same.

BACKGROUND ART

An artificial intelligence system, which is a computer system implementing human-level intelligence, is a system in which a machine performs learning and decision by oneself and a recognition rate is improved as it is used.

An artificial intelligence technology consists of a machine learning (deep learning) technology of using an algorithm classifying/learning features of input data by itself and element technologies of simulating functions such as recognition, decision, and the like, of a human brain using a machine learning algorithm.

The element technologies may include at least one of, for example, a linguistic understanding technology of recognizing human languages/characters, a visual understanding technology of recognizing things like human vision, an inference/prediction technology of performing logical inference and prediction by deciding information, a knowledge representation technology of processing human experience information as knowledge data, or a motion control technology of controlling self-driving of a vehicle and a motion of a robot.

As an example of using such an artificial intelligence technology, there were various methods for modeling and function/service that analyze and use a device use pattern of a user. As a conventional method, for example, there was a method for directly implementing a model learned using a large amount of data in a server in a client device or continuously updating a model of a local device based on a cloud.

However, in a case of directly implementing the model learned in the server in the client device, flexibility of the model capable of reflecting use patterns of users that are continuously changed is not secured, and the cloud-based model is not effective in terms of performance, cost, and the like.

DISCLOSURE

Technical Problem

The disclosure provides to an electronic device capable of providing service recommendation information on the basis of a device use history using resources as small as possible, and a method for controlling the same.

Technical Solution

According to an embodiment of the disclosure, an electronic device includes: a memory configured to store history information corresponding to at least one of each day of the week or each time on each of a plurality of services provided from the electronic device; and a processor configured to assign a weight to a history corresponding to at least one of a day of the week or a time zone where a predetermined event occurs when the predetermined event occurs and select a recommendation service of the plurality of services on the basis of the history to which the weight is assigned.

In this case, the processor may be configured to calculate use indices of each of the plurality of services on the basis of the assigned weight and use times for each of the plurality of services and select the recommendation service of the plurality of services on the basis of the calculated use indices.

In this case, the processor may be configured to calculate the use indices of each of the plurality of services by applying a reduction value corresponding to a day of the week where a service corresponding to the history is performed.

Meanwhile, the processor may be configured to calculate a service use pattern index on the basis of the history information and determines the weight on the basis of the calculated service use pattern index.

In this case, the processor may be configured to determine the weight on the basis of a service use pattern index calculated based on updated history information when the history information is updated.

Meanwhile, the electronic device may further include a communicator configured to communicate with an external server clustering service use pattern indices collected from a plurality of electronic devices, wherein the processor is configured to transmit the calculated service use pattern index to the external server through the communicator, receive weight information corresponding to a cluster to which the calculated service use pattern index belongs from the external server, and determine the weight on the basis of the received weight information.

Meanwhile, the processor may be configured to: calculate variances for use times of each day of the week for each of the plurality of services on the basis of the history information and calculate a day-of-the-week pattern index on the basis of the calculated variances, calculate variances for use times of each time zone for each of the plurality of services on the basis of the history information and calculate a time pattern index on the basis of the calculated variances, and determine the weight on the basis of the calculated day-of-the-week pattern index and the calculated time pattern index.

Meanwhile, the processor may be configured to assign a first weight to a history corresponding to the time zone where the predetermined event occurs and assign a second weight different from the first weight to a history corresponding to the day of the week where the predetermined event occurs.

In this case, the first weight may be larger than the second weight.

Meanwhile, the processor may be configured to assign a third weight smaller than the first and second weights to a history corresponding to a day of the week and a time zone different from the day of the week and the time zone where the predetermined event occurs.

Meanwhile, the processor may be configured to decide that the predetermined event occurs when a control signal corresponding to a specific button of a remote control device controlling the electronic device is received or a control signal corresponding to a specific voice of a user is received.

Meanwhile, the plurality of services may be a plurality of broadcasting channels, a plurality of applications, or a plurality of contents.

According to another embodiment of the disclosure, a method for controlling an electronic device in which history information corresponding to at least one of each day of the week or each time on each of a plurality of services provided from the electronic device is stored includes: assigning a weight to a history corresponding to at least one of a day of the week or a time zone where a predetermined event occurs when the predetermined event occurs; and selecting a recommendation service of the plurality of services on the basis of the history to which the weight is assigned.

In this case, in the selecting, use indices of each of the plurality of services may be calculated on the basis of the assigned weight and use times for each of the plurality of services, and the recommendation service of the plurality of services may be selected on the basis of the calculated use indices.

In this case, in the selecting, the use indices of each of the plurality of services may be calculated by applying a reduction value corresponding to a day of the week where a service corresponding to the history is performed.

Meanwhile, the method for controlling an electronic device may further include calculating service use pattern indices for the plurality of services on the basis of the history information and determining the weight on the basis of the calculated service use pattern indices.

In this case, in the determining of the weight, the weight may be determined on the basis of a service use pattern index calculated based on updated history information when the history information is updated.

Meanwhile, the determining of the weight may include transmitting the calculated service use pattern index to an external server clustering service use pattern indices collected from a plurality of electronic devices and receiving weight information corresponding to a cluster to which the calculated service use pattern index belongs from the external server and determining the weight on the basis of the received weight information.

Meanwhile, the method for controlling an electronic device may further include calculating variances for use times of each day of the week for each of the plurality of services on the basis of the history information and calculating a day-of-the-week pattern index on the basis of the calculated variances, calculating variances for use times of each time zone for each of the plurality of services on the basis of the history information and calculating a time pattern index on the basis of the calculated variances, and determining the weight on the basis of the calculated day-of-the-week pattern index and the calculated time pattern index.

According to still another embodiment of the disclosure, a recording medium includes a program for executing a method for controlling an electronic device in which history information corresponding to at least one of each day of the week or each time on each of a plurality of services provided from the electronic device is stored, wherein the method for controlling an electronic device includes: assigning a weight to a history corresponding to at least one of a day of the week or a time zone where a predetermined event occurs when the predetermined event occurs; and selecting a recommendation service of the plurality of services on the basis of the history to which the weight is assigned.

DESCRIPTION OF DRAWINGS

FIG. 2 is a view for describing diverse embodiments of the disclosure of selecting a recommendation service on the basis of history information.

FIGS. 6 and 7 are views for describing a method for classifying service use patterns according to an embodiment of the disclosure.

BEST MODE

Figure 1:
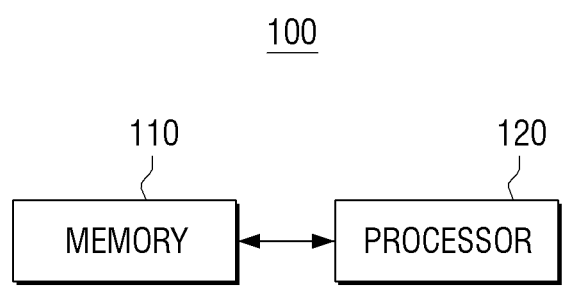
FIG. 1 is a block diagram for describing components of an electronic device according to an embodiment of the disclosure.

Before describing the disclosure in detail, a description method for the specification and the drawings will be described.

First, general terms have been selected in consideration of functions in diverse embodiments of the disclosure as terms used in the specification and the claims. However, these terms may be changed depending on an intention of those skilled in the art, legal or technical interpretation, the emergence of a new technology, and the like. In addition, some terms are terms arbitrarily selected by an applicant. These terms may be interpreted in the meanings defined herein, and may be interpreted based on a general content of the specification and usual technical knowledge in the art as long as they are not specifically defined.

In addition, throughout the accompanying drawings of the specification, the same reference numerals denote parts or components performing substantially the same functions. For convenience of explanation and understanding, different embodiments will be described using the same reference numerals. That is, even though all the components having the same reference numerals are illustrated in a plurality of drawings, the plurality of drawings do not mean one embodiment.

In addition, in the specification and the claims, terms including ordinal numbers such as "first", "second" and the like may be used to distinguish between components. These ordinal numbers are used to distinguish the same or similar components from each other, and the meaning of the terms should not be restrictively construed by the use of these ordinal numbers. As an example, components combined with these ordinal numbers should not be limited in order of use or arrangement by the ordinal numbers. If necessary, the respectively ordinal numbers may be interchangeably used.

In the specification, singular forms include plural forms unless the context clearly indicates otherwise. It will be further understood that terms "include" or "formed of" used in the specification specify the presence of features, numerals, steps, operations, components, parts, or combinations thereof mentioned in the specification, but do not preclude the presence or addition of one or more other features, numerals, steps, operations, components, parts, or combinations thereof.

In embodiments of the disclosure, a term such as a "module", a "unit", "part", or the like, is a term for referring to a component performing at least one function or operation, and such a component may be implemented by hardware or software or be implemented by a combination of hardware and software. In addition, a plurality of "modules", "units", "parts", or the like, are integrated into at least one module or chip, except that they need to be implemented by individual specific hardware, such that they may be implemented by at least one processor.

In addition, in an embodiment of the disclosure, a case where any portion is referred to as being "connected to" another portion not only includes a case where any one portion and another portion are "directly connected to" each other, but also includes a case where any one portion and another portion are "indirectly connected to" each other through the other medium. In addition, unless explicitly described otherwise, "including" any components will be understood to imply the inclusion of other components rather than the exclusion of any other components.

Hereinafter, the disclosure will be described in detail with reference to the accompanying drawings.

FIG. 1 is a block diagram for describing an electronic device according to an embodiment of the disclosure.

Referring to FIG. 1, the electronic device 100 includes a memory 110 and a processor 120.

The electronic device 100 may be implemented by various devices such as a computer, a television (TV), a set top box, a smartphone, a smart watch, and the like.

The memory 110 may be implemented by a nonvolatile memory, a volatile memory, a flash memory, a hard disk drive (HDD), a solid state drive (SSD), or the like. Meanwhile, the memory 110 may be implemented by an external storage medium, for example, a micro secure digital (SD) card, a universal serial bus (USB) memory, a web server through a network, or the like, as well as a storage medium in the electronic device 100.

History information on use of the electronic device 100 by a user may be stored in the memory 110. The history information may include, for example, a device turn-on/off time, a service use history, input information (remote control, voice, or the like), a function use history (menu selection history, or the like) of the electronic device 100. The memory 110 may store history information for each day of the week and each time on each of one or more services provided from the electronic device 100. The memory 110 may store only history information for each day of the week or may store only history information for each time. Specifically, the history information may include information on when a specific service was used (date and time) and how long the specific service was used (used time). The history information may be updated by adding a new history as the user uses a service.

Here, the service may be, for example, a broadcast channel, a content (for example, a video on demand (VoD), a streaming content (video, music, or the like)), or may be a plurality of applications, functions, or the like, that may be executed in the electronic device 100. That is, the history information may include, for example, information on when and how long a specific broadcast channel was watched, may include information on when and how long a specific application was used, and may include information on when and how long a specific content was played. The disclosure is not limited to the example described above, and various kinds of history information may be stored in the memory 110 according to what service the electronic device 100 provides.

The processor 120 is a component for controlling a general operation of the electronic device 100.

For example, the processor 120 may be composed of a central processing unit (CPU), an application processor (AP), and a system on chip (SoC), and may include a separate random access memory (RAM) and read only memory (ROM) distinguished from the memory 110 described above. Here, the ROM is a component in which an instruction set for booting a system is stored, and the CPU copies an operating system (O/S) stored in the memory 110 of the electronic device 100 to the RAM according to an instruction stored in the ROM, and executes the O/S to boot the system. When the booting is completed, the CPU may copy various applications stored in the memory 110 to the RAM and execute the various applications to perform various operations.

When a predetermined event occurs, the processor 120 may provide information on a service that a user is likely to use at a point in time where the predetermined event occurs to the user, on the basis of the history information stored in the memory 110. The processor 120 may provide recommendation information on a service using an artificial intelligence technology. The artificial intelligence technology consists of a machine learning (deep learning) technology of using an algorithm classifying/learning features of input data by itself and element technologies of simulating functions such as recognition, decision, and the like, of a human brain using a machine learning algorithm. The processor 120 may provide the recommendation information on the service using an inference/prediction technology of performing logical inference and prediction by deciding information among the artificial intelligence technologies. The inference/prediction is a technology of performing logical inference and prediction by deciding information, and includes knowledge/probability-based inference, optimization prediction, preference-based planning, recommendation, and the like.

According to an embodiment, when the predetermined event occurs, the processor 120 may assign a weight to a history corresponding to at least one of a day of the week or a time zone where the predetermined event occurs, and select the recommendation service of a plurality of service on the basis of the history to which the weight is assigned. Here, the history refers to at least one of the number of times of service use or a service use time included in the history information.

Here, the predetermined event may be, for example, an event in which the user selects a specific button of a remote control device controlling the electronic device 100 and a control signal corresponding to the selection of the specific button is received by the electronic device 100. As another example, the electronic device 100 may receive a voice command, and the predetermined event may be an event in which the user utters a specific voice, for example, "recommend a channel", and the corresponding voice command is received by the electronic device 100. As another example, the predetermined event may be an event in which the electronic device 100 is turned on. As another example, the predetermined event may be an event in which a recommendation menu displayed on a touch screen of the electronic device 100 is selected. As another example, the predetermined event may be an event in which a predetermined time comes. As another example, the predetermined event may be an event in which the history information stored in the memory is updated. The predetermined event is not limited to the examples described above, and may be any event in which recommendation of the service is demanded.

When the predetermined event occurs, the processor 120 may assign a first weight W1 to a history corresponding to the time zone where the predetermined event occurs, assign a second weight W2 to a history corresponding to the day of the week where the predetermined event occurs, and assign a third weight W3 to a history corresponding to a day of the week and a time zone different from the day of the week and the time zone where the predetermined event occurs to calculate use indices for each of the plurality of services. In addition, the processor 120 may select the recommendation service on the basis of order in which a use index is high. Here, the first weight, the second weight, and the third weight may be different values, and magnitudes of the values of the first weight, the second weight, and the third weight may be large in order of the first weight, the second weight, and the third weight. In addition, the third weight may be set to "1", which is a basic value.

Meanwhile, the respective weights may be assigned to all of the history corresponding to the time zone where the predetermined event occurs, the history corresponding to the day of the week where the predetermined event occurs, and the history corresponding to the day of the week and the time zone different from the day of the week or the time zone where the predetermined event occurs as described above, but the weights may be assigned to any one or two of these three histories to calculate the use indices.

FIG. 2 is a view for describing an example of calculation of use indices.

Referring to FIG. 2, it is assumed that a plurality of services are broadcast channels and that there is a channel watching history from Jul. 24, 2017 to Jul. 30, 2017 in the memory 110. When a predetermined event (for example, an event in which the user selects a specific button of a remote control) occurs at 8 p.m. on Aug. 4, 2017 (Saturday), a first weight W1 is assigned to a watching history corresponding to a time zone to which 8 p.m. belongs, a second weight W2 is assigned to a watching history corresponding to Saturday, and a third weight W3 is assigned to a watching history corresponding to the other days of the week and the other time zones, such that use indices of each of the plurality of broadcasting channels are calculated.

In detail, because there are four watching histories for channel CB # on a day of the week and a time zone different from a day of the week and a time zone where the predetermined event occurs, a use index for channel CB # is 4×W3. Because there is one watching history for channel FO # on the time zone where the predetermined event occurs and there is one watching history for channel FO # on the day of the week where the predetermined event occurs, a use index for channel FO # is 1×W1+1×W2. Because there are three watching histories for channel ESP # on the time zone where the predetermined event occurs and there is one watching history for channel ESP # on the day of the week and the time zone different from the day of the week and the time zone where the predetermined event occurs, a use index for channel ESP # is 3×W1+1×W3. Because there are two watching histories for channel TN # on the time zone where the predetermined event occurs, a use index for channel TN # is 2×W1. Because there is one watching history for channel Golf on the day of the week and the time zone different from the day of the week and the time zone where the predetermined event occurs, a use index for channel Golf is 1×W3.

It has been described that the use indices are calculated on the basis of the number of times of use (the number of times of watching) in the example described above, but according to another embodiment, the use indices may be calculated on the basis of a use time (a watching time). The use indices may be calculated by dividing the use time in units of 1 hour. This will be described with reference to FIG. 2. Because there are watching histories for channel CB # from 5 p.m. to 6 p.m. on Tuesday, from 5 p.m. to 6 p.m. on Wednesday, from 5 p.m. to 6 p.m. on Thursday, and from 10 p.m. to 11 p.m. on Friday that do not correspond to the day of the week and the time zone where the predetermined event occurs, a use index for channel CB # is 1 hr×W3+1 hr×W3+1 hr×W3+1 hr×W3. Because there is a watching history (1 hr×W2) for channel FO # for 1 hour from 7 p.m. to 8 p.m. on Saturday that is the day of the week where the predetermined event occurs, but is not the time zone where the predetermined event occurs and there is a watching history (1 hr×(W1+W2) for channel FO # for 1 hour from 8 p.m. to 9 p.m. on Saturday that is the day of the week where the predetermined event occurs and is the time zone where the predetermined event occurs, a use index for channel FO # is 1 hr×W2+1 hr×(W1+W2). Because there is a watching history (1 hr×W3) for channel ESP # for 1 hour from 7 p.m. to 8 p.m. on Monday that does not correspond to the day of the week and the time zone where the predetermined event occurs, there is a watching history (1 hr×W1) for channel ESP # for 1 hour from 8 p.m. to 9 p.m. on Monday that does not correspond to the day of the week where the predetermined event occurs, but corresponds to the time zone where the predetermined event occurs, there is a watching history (1 hr×W3) for channel ESP # for 1 hour from 9 p.m. to 10 p.m. on Monday that does not correspond to the day of the week and the time zone where the predetermined event occurs, there is a watching history (1 hr×W3) for channel ESP # for 1 hour from 7 p.m. to 8 p.m. on Tuesday that does not correspond to the day of the week and the time zone where the predetermined event occurs, there is a watching history (1 hr×W1) for channel ESP # for 1 hour from 8 p.m. to 9 p.m. on Tuesday that does not correspond to the day of the week where the predetermined event occurs, but corresponds to the time zone where the predetermined event occurs, there is a watching history (1 hr×W3) for channel ESP # for 1 hour from 7 p.m. to 8 p.m. on Friday that does not correspond to the day of the week and the time zone where the predetermined event occurs, there is a watching history (1 hr×W1) for channel ESP # for 1 hour from 8 p.m. to 9 p.m. on Friday that does not correspond to the day of the week where the predetermined event occurs, but corresponds to the time zone where the predetermined event occurs, there is a watching history (1 hr×W3) for channel ESP # for 1 hour from 5 p.m. to 6 p.m. on Sunday that is different from the day of the week and the time zone where the predetermined event occurs, and there is a watching history (1 hr×W3) for channel ESP # for 1 hour from 6 p.m. to 7 p.m. on Sunday that is different from the day of the week and the time zone where the predetermined event occurs, a use index for channel ESP # is 1 hr×W3+1 hr×W1+1 hr×W3+1 hr×W3+1 hr×W1+1 hr×W3+1 hr×W1+1 hr×W3+1 hr×W3. Because there is a watching history (1 hr×W3) for channel TN # for 1 hour from 7 p.m. to 8 p.m. on Wednesday that does not correspond to the day of the week and the time zone where the predetermined event occurs, there is a watching history (1 hr×W1) for channel TN # for 1 hour from 8 p.m. to 9 p.m. on Wednesday that does not correspond to the day of the week where the predetermined event occurs, but corresponds to the time zone where the predetermined event occurs, there is a watching history (1 hr×W3) for channel TN # for 1 hour from 7 p.m. to 8 p.m.

on Thursday that does not correspond to the day of the week and the time zone where the predetermined event occurs, and there is a watching history (1 hr×W1) for channel TN # for 1 hour from 8 p.m. to 9 p.m. on Thursday that does not correspond to the day of the week where the predetermined event occurs, but corresponds to the time zone where the predetermined event occurs, a use index for channel TN # is 1 hr×W3+1 hr×W1+1 hr×W3+1 hr×W1. Because there is a watching history (1 hr×W3) for channel Golf for 1 hour from 10 p.m. to 11 p.m. on Monday that is a day of week and a time zone different from the day of the week and the time zone where the predetermined event occurs and there is a watching history (1 hr×W3) for channel Golf for 1 hour from 10 p.m. to 11 p.m. on Monday that is a day of week and a time zone different from the day of the week and the time zone where the predetermined event occurs, a use index for channel Golf is 1 hr×W3+1 hr×W3. This is summarized in the following Table 1.

TABLE 1

| Channel | Use Index |
| --- | --- |
| CB# | 1 hr × W3 + 1 hr × W3 + 1 hr × W3 + 1 hr × W3 |
| FO# | 1 hr × W2 + 1 hr × (W1 + W2) |
| ESP# | 1 hr × W3 + 1 hr × W1 + 1 hr × W3 + 1 hr × W3 + 1 hr × W1 + 1 hr × W3 + 1 hr × W1 + 1 hr × W3 + 1 hr × W3 |
| TN# | 1 hr × W3 + 1 hr × W1 + 1 hr × W3 + 1 hr × W1 |
| Golf | 1 hr × W3 + 1 hr × W3 |

Meanwhile, it has been described in the embodiment described above that the use indices are calculated using 1 hour as one unit, but according to another embodiment of the disclosure, the use indices may be calculated using a period from a watching start point in time of a specific channel to a watching end point in time of the specific channel as one unit. This will be described with reference to FIG. 2. Because there are watching histories for channel CB # from 5 p.m. to 6 p.m. (1 hr) on Tuesday, from 5 p.m. to 6 p.m. (1 hr) on Wednesday, from 5 p.m. to 6 p.m. on Thursday, and from 10 p.m. to 11 p.m. (1 hr) on Friday that do not correspond to the day of the week and the time zone where the predetermined event occurs, a use index for channel CB # is 1 hr×W3+1 hr×W3+1 hr×W3+1 hr×W3. Because there is a watching history for channel FO # for 2 hours from 7 p.m. (watching start point in time) to 9 p.m. (watching end point in time) on Saturday that is the day of the week where the predetermined event occurs and is a time zone to which 8 p.m. corresponding to a time at which the predetermined event occurs belongs, a use index for channel FO # is 2 hr×(W1+W2). Because there is a watching history for channel ESP # for a total of 7 hours from 7 p.m. to 10 p.m. (3 hr) on Monday, from 7 p.m. to 9 p.m. (2 hr) on Tuesday, and from 7 p.m. to 9 p.m. (2 hr) on Friday that are the time zone where the predetermined event occurs and there is a watching history for channel ESP # for 2 hours from 5 p.m. to 7 p.m. (2 hr) on Sunday that is a day of week and a time zone different from the day of the week and the time zone where the predetermined event occurs, a use index for channel ESP # is 3 hr×W1+2 hr×W1+2 hr×W1+2 hr×W. Because there is a watching history for channel TN # for 2 hours from 7 p.m. to 9 p.m. on Wednesday and 2 hours from 7 p.m. to 9 p.m. on Thursday that are the time zone where the predetermined event occurs, a use index for channel TN # is 2 hr×W1+2 hr×W1. Because there is a watching history for channel Golf for 2 hours from 10 p.m. to 12 a.m. on Monday that is a day of the week and a time zone different from the day of the week and the time zone where the predetermined event occurs, a use index for channel Golf is 2 hr×W3. This is summarized in the following Table 2.

TABLE 2

| Channel | Use Index |
| --- | --- |
| CB# | 1 hr × W3 + 1 hr × W3 + 1 hr × W3 + 1 hr × W3 |
| FO# | 2 hr × (W1 + W2) |
| ESP# | 3 hr × W1 + 2 hr × W1 + 2 hr × W1 + 2 hr × W3 |
| TN# | 2 hr × W1 + 2 hr × W1 |
| Golf | 2 hr × W3 |

Meanwhile, according to another embodiment of the disclosure, the use index may be calculated by applying a reduction value corresponding to a date on which a service corresponding to the history is performed. That is, it has been described in the embodiments described above that the use index is calculated on the basis of 'use time (T)×weight (W)', but according to an embodiment in which the reduction value is applied, the use index is calculated on the basis of 'reduction value (R)×use time (T)×weight (W)'. The reduction value may be determined so that a reduction rate becomes large as a data becomes old. For example, the reduction value R may be defined as follows:

Reduction Value $(R)=(1-r)^d$.

Here, $0<r<1$, and d is a difference between a day on which a service corresponding to a history is performed and a day on which the event occurs.

It will be described to apply the reduction values to values calculated in Table 1. Representatively, channel CB # will be described. When the day on which the predetermined event occurs is Aug. 4, 2017, in a case where channel CB # is viewed from 5 p.m. to 6 p.m. on Jul. 25, 2017, a difference (d) between Aug. 4, 2017 and Jul. 25, 2017 is 11, and a use index for channel CB # is thus calculated to be $(1-r)^{11}$×1 hr×W3. In a similar manner, in a case where channel CB # is viewed from 5 p.m. to 6 p.m. on Jul. 26, 2017, a use index for channel CB # is calculated to be $(1-r)^{10}$×1 hr×W3, in a case where channel CB # is viewed from 5 p.m. to 6 p.m. on Jul. 27, 2017, a use index for channel CB # is calculated to be $(1-r)^9$×1 hr×W3, and in a case where channel CB # is viewed from 10 p.m. to 11 p.m. on Jul. 28, 2017, a use index for channel CB # is calculated to be $(1-r)^8$×1 hr×W3. Results obtained by calculating use indices for the remaining channels in a similar manner are illustrated in Table 3.

TABLE 3

| Channel | Use Index |
| --- | --- |
| CB# | $(1 - r)^{11}$ × 1 hr × W3 + $(1 - r)^{10}$ × 1 hr × W3 + $(1 - r)^9$ × 1 hr × W3 + $(1 - r)^8$ × 1 hr × W3 |
| FO# | $(1 - r)^7$ × {1 hr × W2 + 1 hr × (W1 + W2)} |
| ESP# | $(1 - r)^{12}$ × {1 hr × W3 + 1 hr × W1 + 1 hr × W3} + $(1 - r)^{11}$ × {1 hr × W3 + 1 hr × W1} + $(1 - r)^8$ × {1 hr × W3 + 1 hr × W1} + $(1 - r)^6$ × {1 hr × W3 + 1 hr × W3} |
| TN# | $(1 - r)^{10}$ × {1 hr × W3 + 1 hr × W1} + $(1 - r)^9$ × {1 hr × W3 + 1 hr × W1} |
| Golf | $(1 - r)^{12}$ × {1 hr × W3 + 1 hr × W3} |

Results obtained by applying the reduction values to the values calculated in Table 2 are illustrated in Table 4.

TABLE 4

| Channel | Use Index |
| --- | --- |
| CB# | $(1-r)^{11} \times 1\ hr \times W3 + (1-r)^{10} \times 1\ hr \times W3 + (1-r)^{9} \times 1\ hr \times W3 + (1-r)^{8} \times 1\ hr \times W3$ |
| FO# | $(1-r)^{7} \times 2\ hr \times (W1 + W2)$ |
| ESP# | $(1-r)^{12} \times 3\ hr \times W1 + (1-r)^{11} \times 2\ hr \times W1 + (1-r)^{8} \times 2\ hr \times W1 + (1-r)^{6} \times 2\ hr \times W3$ |
| TN# | $(1-r)^{10} \times 2\ hr \times W1 + (1-r)^{9} \times 2\ hr \times W1$ |
| Golf | $(1-r)^{12} \times 2\ hr \times W3$ |

When the concept of the reduction value is applied as in the example described above, the use index is calculated so that a recent use history is reflected in a larger ratio, and a recommendation service more appropriate for a recent service use tendency of the user may thus be provided. Meanwhile, it has been described that history information of a week is used in the examples described with reference to FIG. 2, but the disclosure is not limited thereto, and history information of recent few days or recent few weeks may be used or information on an entire history accumulated from a first use date of the electronic device 100 may be used.

The processor 120 may select the recommendation service on the basis of the calculated use index. For example, when magnitudes of the use indices are in order of channel ESP #>channel TN #>channel FO #>channel CB #>channel Golf, the processor 120 may select channel ESP # having the highest use index as the recommendation service or select channel ESP #, channel TN #, and channel FO # up to a predetermined ranking (for example, a third place) as the recommendation service.

In addition, the processor 120 may provide information on the selected recommendation service through an output.

The output, which is a component capable of providing the information on the recommendation service, may be implemented by, for example, a speaker or a display provided in the electronic device 100.

As another example, the electronic device 100 may perform wired or wireless communication through a communicator to transmit the information on the recommendation service to an external device. In this case, the communicator may be connected to the external device through, for example, a local area network (LAN) or the Internet network, and may be connected to the external device in a wireless communication manner (for example, Z-wave, 4LoWPAN, RFID, LTE D2D, BLE, GPRS, Weightless, Edge Zigbee, ANT+, NFC, IrDA, DECT, WLAN, Bluetooth, Wi-Fi, Wi-Fi direct, GSM, UMTS, LTE, WiBRO, or the like) or in a wired communication manner (for example, a port such as RGB, DVI, HDMI, DP, Thunderbolt, or the like).

FIGS. 3A to 5 are views for describing some examples of providing information on the recommendation service.

Figure 3A:
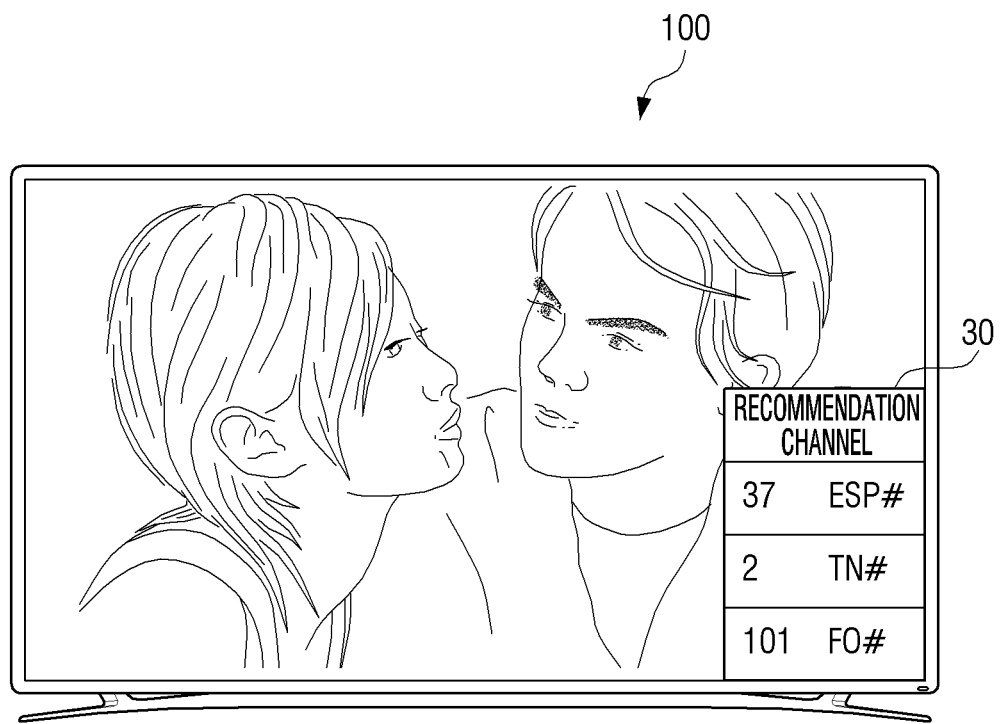
FIGS. 3A, 3B, 4 and 5 are views for describing methods for providing information on a recommendation service according to diverse embodiments of the disclosure.

Referring to FIG. 3A, in a case where the electronic device 100 is a television (TV) and a recommendation target service is a broadcasting channel, when a predetermined event occurs (for example, when a specific button is selected in a remote control device), a user interface (UI) element 30 on which at least one channel selected as a recommendation channel may be selected may be displayed. The user may select and watch a desired channel through the UI element 30. In a case where the number of services selected as the recommendation service is several, these services may be provided in a state where they are aligned in descending order of use indices.

As another manner, in a case of selecting a channel by moving a cursor on a UI to which broadcasting channels are mapped and which has a scroll form, an indicator (for example, a star-shaped mark) may be displayed on a portion at which a recommendation broadcasting channel is positioned on the UI having the scroll form. This will be described with reference to FIG. 3B.

Figure 3B:
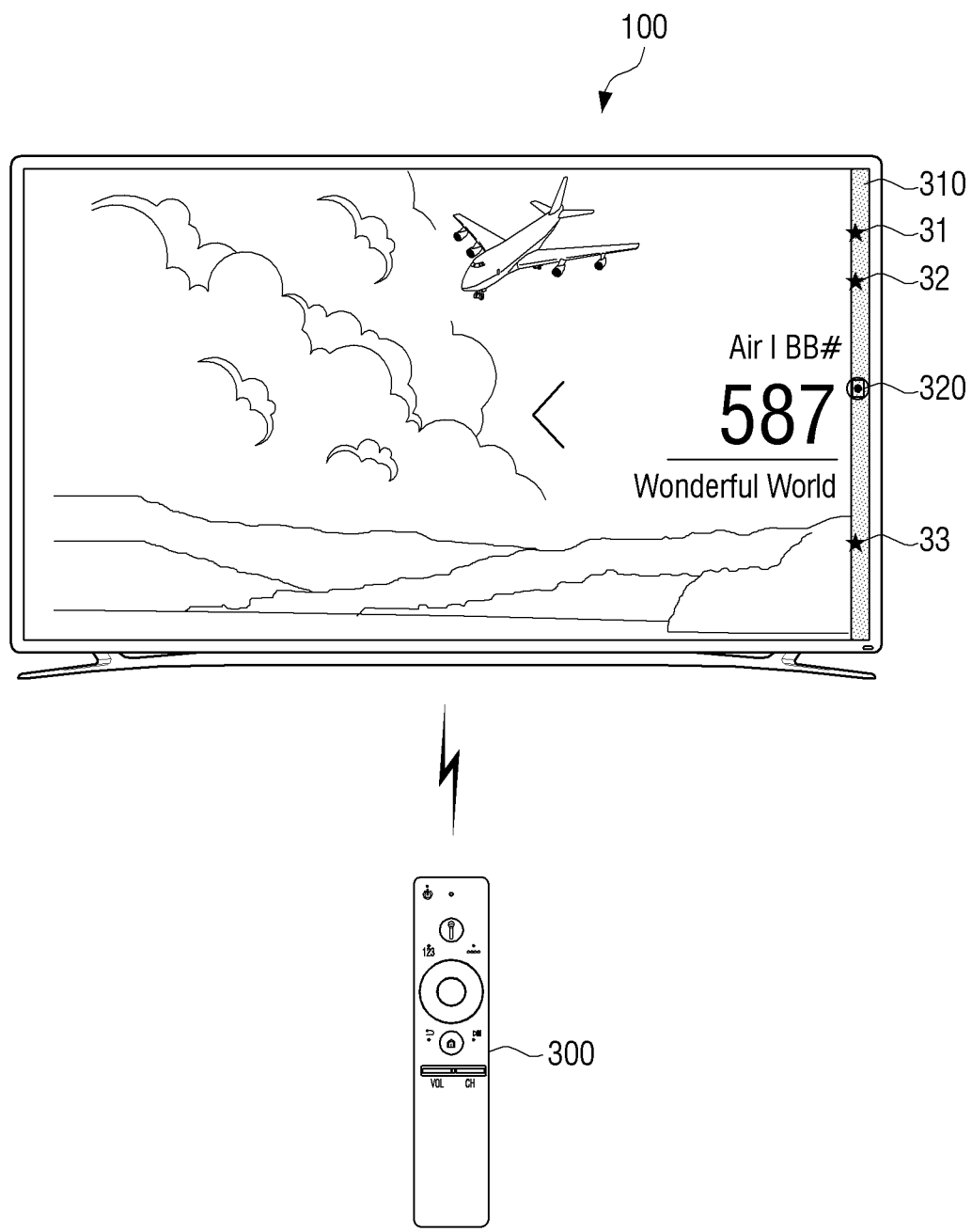

Referring to FIG. 3B, a UI 310 having a scroll form may be provided on the electronic device 100. A plurality of channels are mapped to the UI 310 having the scroll form, and a cursor 320 may be vertically moved through a remote control device 300 to select the channels. In detail, when the cursor 320 is moved and stays at a specific position for a certain time, a channel corresponding to the specific position may be selected. Indicators 31, 32, and 33 indicating places at which channels selected as the recommendation channels are positioned may be displayed on the UI 310 having the scroll form. The user may move the cursor to the places at which the indicators 31, 32, and 33 are positioned to select the recommendation channels.

As another manner of recommending a broadcasting channel, a recommendation broadcasting channel may be displayed on an electronic program guide (EPG) to be different from other broadcasting channels (for example, displayed by a different color).

Figure 4:
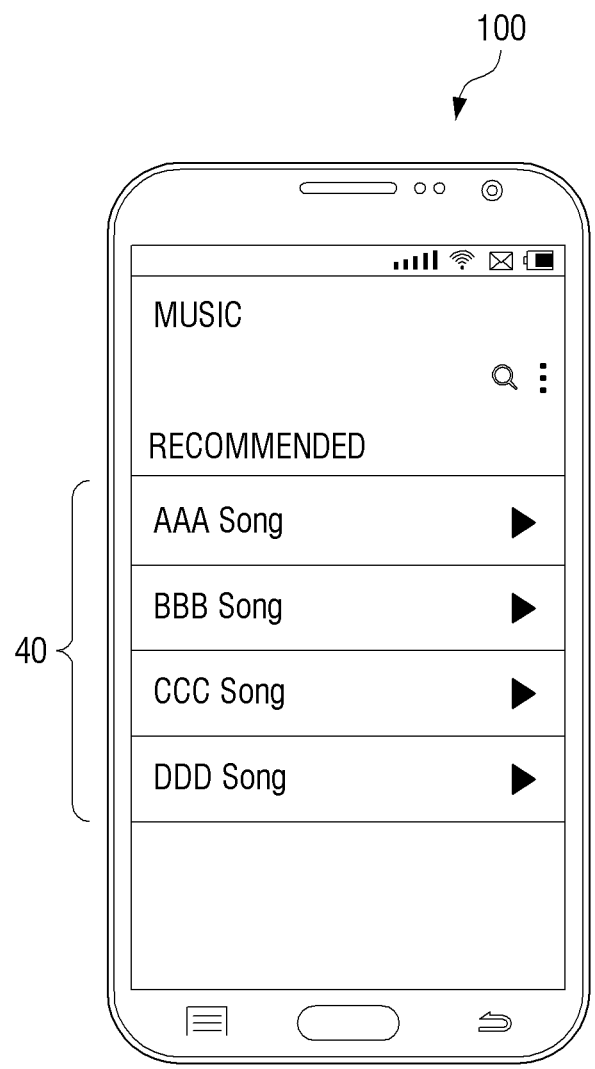

Referring to FIG. 4, when the electronic device 100 is a smartphone and a predetermined event occurs (for example, when "RECOMMENDED" is touched), an UI element 40 on which music selected as recommendation music may be selected may be displayed. The user may select and play a desired music through the UI element 40.

Figure 5:
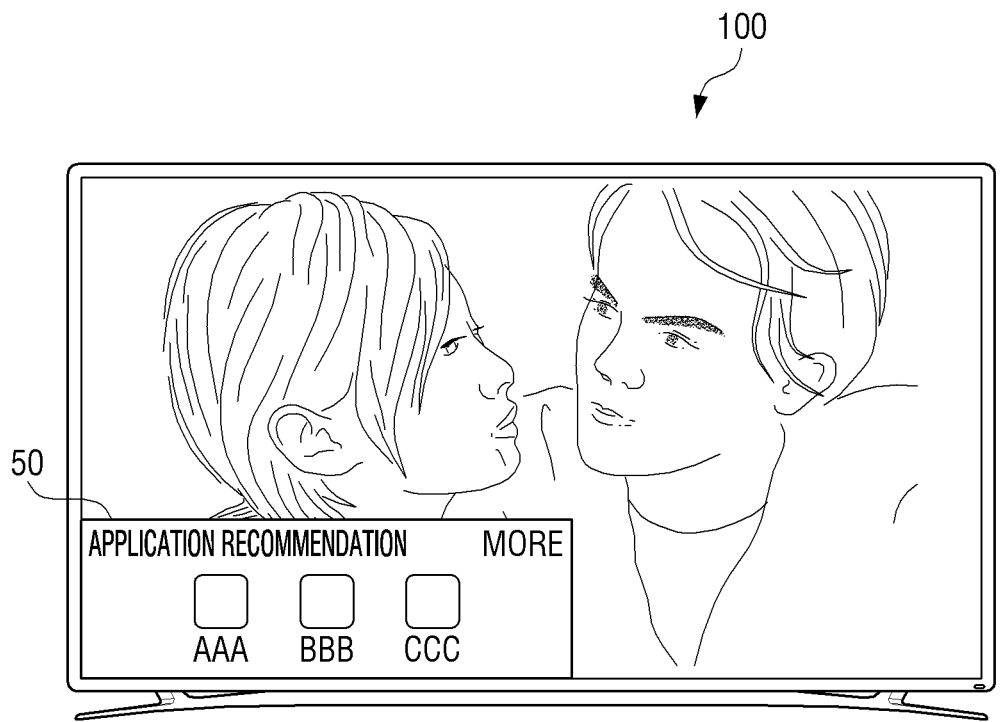

Referring to FIG. 5, in a case where a recommendation target service is an application, when a predetermined event occurs (for example, when a predetermined time comes), an UI element 50 including icons corresponding to applications selected as recommendation applications may be displayed. The user may select and execute a desired application through the UI element 50. When 'More' is selected, applications of the next rankings, that is, applications having the next highest use indices may be displayed.

Meanwhile, it has been described in FIGS. 3 to 5 that the recommendation information is provided from the electronic device 100, but the recommendation information may also be provided by a device outside the electronic device 100. For example, in a case where the electronic device 100 is implemented by the smartphone, the information on the recommendation service may be provided to a large screen device such as a TV or the like through wireless communication such as mirroring, digital living network alliance (DLNA), Wi-Fi, or the like, such that the information on the recommendation service may be displayed on a large screen.

According to an embodiment of the disclosure, an adaptive service recommendation service may be provided according to service use patterns for each user by applying a self-verified pattern classifier. In detail, a service more suitable for a tendency of the user may be recommended by adaptively determining the weights W1, W2, W3 assigned to the histories according to the service use patterns of the users. To this end, according to an embodiment of the disclosure, service use pattern indices obtained by quantifying the service use patterns of the users may be used.

The service use pattern indices are obtained by quantifying the service use patterns of the users, such as a service use pattern of a user who mainly uses a service only in a specific time zone, a service use pattern of a user who mainly uses a service only on a specific day of the week, a service use pattern of a user who uniformly uses a service over all time zones, and the like. The processor 120 may calculate the service use pattern indices on the basis of the history information stored in the memory 110.

The service use pattern indices may be set to become large as a deviation degree from an average becomes large, by introducing a variance concept. Therefore, a service use pattern index of a user whose service use ratio is large on a specific day of the week or at a specific time is larger than that of a user who uniformly uses a service over all time zones or all days of the week.

The service use pattern index may include at least one of a day-of-the-week pattern index or a time pattern index. The day-of-the-week pattern index may be calculated on the basis of use histories for each day of the week, and the time pattern index may be calculated on the basis of use histories for each time zone.

An example of a method for calculating the day-of-the-week pattern index will be described. The processor 120 may calculate variances for use times of each day of the week for each of the plurality of services on the basis of the history information stored in the memory 110, and calculate the day-of-the-week pattern index on the basis of the calculated variances. For example, in a case where first to third services are used according to the history information, the processor 120 calculates a variance for use times of each day of the week for the first service, calculates a variance for use times of each day of the week for the second service, and calculates a variance for use times of each day of the week for the third service. The sum of values obtained by multiplying the variances calculated for the first to third services by use rates of the corresponding services becomes the day-of-the-week pattern index.

An example of a method for calculating the time pattern index will be described. The processor 120 may calculate variances for use times of each time zone for each of the plurality of services on the basis of the history information stored in the memory 110, and calculate the time pattern index on the basis of the calculated variances. For example, in a case where first to third services are used according to the history information, the processor 120 calculates a variance for use times of each time zone for the first service, calculates a variance for use times of each time zone for the second service, and calculates a variance for use times of each time zone for the third service. The sum of values obtained by multiplying the variances calculated for the first to third services by use rates of the corresponding services becomes the time pattern index.

Meanwhile, a use history that becomes a basic in calculating the service use pattern index may be, for example, a use history for recent few weeks or few days or an entire use history. A history for a service used for a time less than a predetermined time (for example, 10 minutes) may be ignored in calculating the service use pattern index.

The processor 120 may determine weights on the basis of the service use pattern indices for the plurality of services. For example, information for different weights for each of the service use pattern indices is stored in the memory 110, and the processor 120 may select a weight corresponding to a current calculated service use pattern index from the stored information on the weights.

Because the service use pattern indices are calculated on the basis of the history information, when the history information is updated according to the use of the electronic device 100, the service use pattern indices are recalculated on the basis of the updated history information, and the weights are also updated on the basis of the recalculated service use pattern indices. The update may be performed every predetermined period.

As described above, according to the disclosure, the weights are adaptively changed according to a change in the watching history, such that a service suitable for a recent service use pattern of the user can be recommended. In addition, the recommendation is not performed on the basis of a server, and may be performed in real time on the electronic device 100.

According to another embodiment, the service use pattern of the user of the electronic device 100 is relatively compared with service use patterns of users of the other electronic devices, and a weight suitable for characteristics obtained by the comparison may be determined. To this end, the service use pattern indices calculated in the electronic device 100 as described above and service use pattern indices calculated in the other electronic devices may be clustered, and a weight corresponding to a cluster to which the service use pattern indices calculated in the electronic device 100 belong may be selected. An operation of clustering the service use pattern indices may be performed by an external server. This will be described with reference to FIG. 6.

Figure 6:
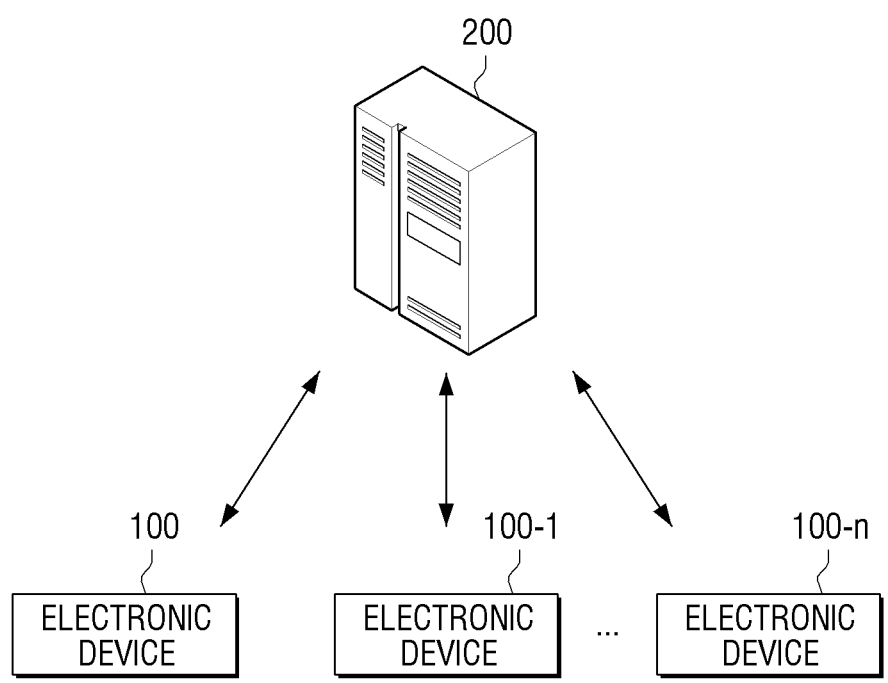

Referring to FIG. 6, the electronic device 100 and the other electronic devices 100-1 to 100-$n$ may transmit service use pattern indices to a server 200, and the server 200 may apply an artificial intelligence technology to collected data to determine what characteristics the service use patterns of users of the respective electronic devices have. It is preferable that the other electronic devices 100-1 to 100-$n$ are devices whose correlation with the electronic device 100 is high. The reason is that comparison between service use patterns of users of devices having a correlation may be advantageous in deducing a meaningful result. Therefore, according to an embodiment, the other electronic devices 100-1 to 100-$n$ may be devices positioned in the same region as a region in which the electronic device 100 is positioned. For example, the electronic device 100 and the other electronic devices 100-1 to 100-$n$ may be TVs used in homes of a specific city.

The artificial intelligence technology consists of a machine learning (deep learning) technology of using an algorithm classifying/learning features of input data by itself and element technologies of simulating functions such as recognition, decision, and the like, of a human brain using a machine learning algorithm, and the server 200 may cluster the service use patterns of the respective electronic devices using a knowledge representation technology of processing human experience information as knowledge data among these element technologies. The knowledge representation is a technology of automating and processing human experience information as knowledge data, and includes knowledge construction (data creation/classification), knowledge management (data utilization), and the like.

As an example, the server 200 may cluster and classify the service use pattern indices into N clusters on the basis of a value of a standard deviation ($\sigma$) of the collected service use pattern indices.

As an example, the server 200 may classify the collected time pattern indices into a cluster of weak time patterns (time pattern index<$0.5\sigma$), a cluster of intermediate time patterns ($0.5\sigma \leq$ time pattern index<$\sigma$), and a cluster of strong time patterns (time pattern index>$\sigma$). In addition, the server 200 may classify the collected day-of-the-week pattern indices into a cluster of weak day-of-the-week patterns (day-of-the-week pattern index<$0.5\sigma$), a cluster of intermediate day-of-the-week patterns ($0.5\sigma \leq$ day-of-the-week pattern index<$\sigma$), and a cluster of strong day-of-the-week patterns (day-of-the-week pattern index>σ). Nine groups as illustrated in FIG. 7 may be defined by a combination of three time pattern clusters and three day-of-the-week pattern clusters clustered as described above. In addition, a first weight W1, a second weight W2, and a third weight W3 may be set according to characteristics of each of the nine groups. Numerals in parentheses in FIG. 7 refer (W1: W2: W3). The strong the pattern, the larger the set value of the weight. In other words, when dependence of the service use pattern of the user on a time is high, a time weight is set to be high, and when dependence of the service use pattern of the user on a day of the week is high, a day-of-the-week weight is set to be high.

The server 200 transmits weight information corresponding to groups to which each of the electronic device 100 and the other electronic devices 100-1 to 100-n belongs to the electronic device 100. For example, when the group to which the electronic device 100 belongs is a 'weak day-of-the-week pattern & strong time pattern group', a content informing the electronic device 100 that W1=30, W2=5, and W3=1 is included in the weight information transmitted by the server 200. Alternatively, only a content informing the electronic device 100 that the group to which the electronic device 100 belongs is the 'weak day-of-the-week pattern & strong time pattern group' is included in the information transmitted to the electronic device 100 by the server 200, and the electronic device 100 may determine weights W1=30, W2=5, and W3=1 on the basis of the information received from the server 200 and weight information for each group stored in the electronic device 100.

As described above, according to the disclosure, a model for selecting the recommendation service on the basis of the history information and the weights is implemented in the electronic device 100, and the server 200 derives a parameter for grouping using a large amount of data, and the model of the electronic device 100 may be updated on the basis of a value of the parameter. Therefore, the recommendation service may be selected by reflecting service use patterns that may be continuously changed, using resources as small as possible.

Meanwhile, it has been described in an example described with reference to FIG. 7 that the service use pattern indices are classified into the nine groups, but this is only an example, and the service use pattern indices may also be classified into another number of groups. In addition, the weight values in parentheses in FIG. 7 are only examples, and the disclosure is not limited thereto. In addition, it has been described in the example described above that the same weight is applied to the service use pattern indices belonging to the same group, but even though the service use pattern indices are in the same group, different weights may also be applied to the service use pattern indices on the basis of relative positions within the same group.

Meanwhile, all or some of operations described as being performed in the server 200 may be performed in the electronic device 100. For example, the electronic device 100 may receive the information on the service use pattern indices from the other electronic devices 100-1 to 100-n, perform the clustering as in the method described above, and determine the weights on the basis of the weight information corresponding to the cluster to which the electronic device 100 belongs.

In addition, some of operations performed in the electronic device 100 may be performed in the server 200. For example, the electronic device 100 may provide the history information to the server 200 and the server 200 may calculate the service use pattern index, and the server 200 may calculate a use index to select the recommendation service, and provide information on the selected recommendation service to the electronic device 100. That is, main operations may be performed in the server 200, and the electronic device 100 may be in charge of only an output function of the information. However, because the history information is personal information, it is preferable that the history information is not leaked to the outside. Therefore, a manner in which the electronic device 100 transmits the service use pattern index obtained by processing the history information instead of the history information to the server 200 may be preferred.

Meanwhile, a recommendation service whose use possibility is high may be provided on the basis of history information of the other electronic devices 100-1 to 100-n rather than the history information stored in the electronic device 100. For example, the server 200 may receive history information from at least one of the other electronic devices 100-1 to 100-n, calculate the service use pattern index and the service use index as described above on the basis of the received history information to select the recommendation service, and provide the information on the selected recommendation service to the electronic device 100. Alternatively, the electronic device 100 may receive history information directly from at least one of the other electronic devices 100-1 to 100-n not through the server 200, and calculate the service use pattern index and the service use index as described above on the basis of the received history information to select the recommendation service. According to the present embodiments, services preferred by users of the other electronic devices may be provided by the electronic device 100.

Figure 8:
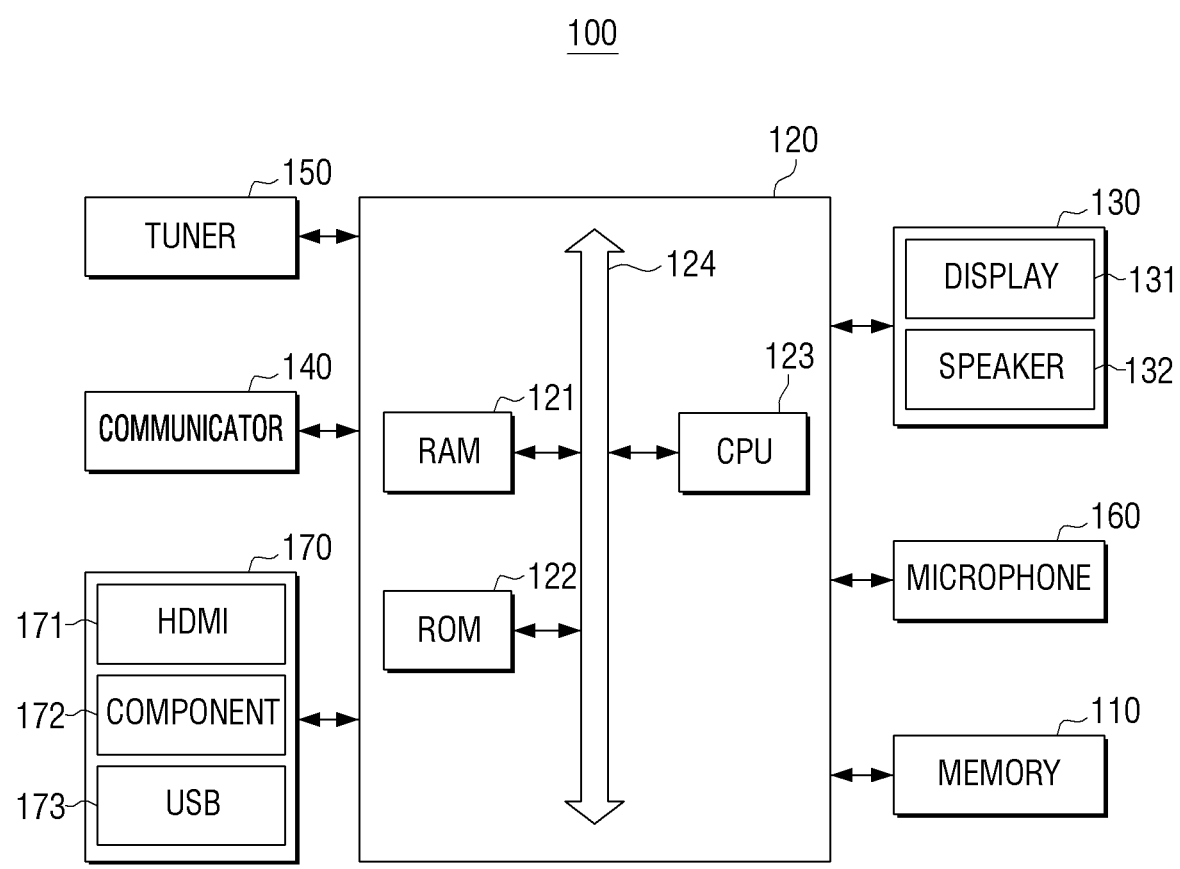
FIG. 8 is a block diagram for describing components of an electronic device according to another embodiment of the disclosure.

FIG. 8 is a block diagram illustrating components of the electronic device 100 in a case where the electronic device 100 is implemented by a TV. In describing FIG. 8, a description for components overlapping those described in FIG. 1 will be omitted.

Referring to FIG. 8, the electronic device 100 may be implemented by, for example, an analog TV, a digital TV, a three-dimensional (3D) TV, a smart TV, a light emitting diode (LED) TV, an organic light emitting diode (OLED) TV, a plasma TV, a monitor, a curved TV having a screen with a fixed curvature, a flexible TV having a screen with a fixed curvature, a bended TV having a screen with a fixed curvature, a curvature variable TV in which a current curvature of a screen may be varied by a received user input, or the like, but is not limited thereto.

The electronic device 100 includes a memory 110, a processor 120, an output 130, a communicator 140, a tuner 150, a microphone 160, and a port 170.

The tuner 150 may tune and select only a frequency of a channel that is intended to be received in the electronic device 100 among many radio wave components through amplification, mixing, resonance, or the like, of broadcasting signals received in a wired or wireless manner. The broadcasting signals may include a video, an audio, and additional data (for example, an electronic program guide (EPG)).

The tuner 150 may receive a video, an audio, and data in a frequency band corresponding to a channel number corresponding to a user input.

The tuner 150 may receive the broadcasting signals from various sources such as terrestrial broadcasting, cable broadcasting, satellite broadcasting, or the like. The tuner 150 may also receive the broadcasting signals from various sources such as analog broadcasting, digital broadcasting, or the like.

The tuner 150 may be implemented integrally with (all-in-one) the electronic device 100 or be implemented by a separate device (for example, a set-top box or a tuner connected to the port 170)) having a tuner unit electrically connected to the electronic device 100.

The communicator 140 is a component performing communication with various types of external devices according to various types of communication manners. The communicator 140 may be connected to the external device through a local area network (LAN) or the Internet network, and may be connected to the external device in a wireless communication manner (for example, Z-wave, 4LoWPAN, RFID, LTE D2D, BLE, GPRS, Weightless, Edge Zigbee, ANT+, NFC, IrDA, DECT, WLAN, Bluetooth, Wi-Fi, Wi-Fi direct, GSM, UMTS, LTE, WiBRO, or the like). The communicator 140 may include various communication chips such as a Wi-Fi chip, a Bluetooth chip, a near field communication (NFC) chip, a wireless communication chip, and the like. The Wi-Fi chip, the Bluetooth chip, and the NFC chip perform communication in a Wi-Fi manner, a Bluetooth manner, an NFC manner, respectively. The wireless communication chip means a chip performing communication depending on various communication protocols such as Institute of Electrical and Electronics Engineers (IEEE), Zigbee, $3^{rd}$ generation (3G), $3^{rd}$ generation partnership project (3GPP), long term evolution (LTE), and the like. In addition, the communicator 140 may include an optical receiver capable of receiving a control signal (for example, an infrared (IR) pulse) from the external device. A user command input from the external device may be received through the communicator 140, the information on the selected recommendation service may be transmitted to an external user terminal through the communicator 140, and data may be transmitted to and received from the server 200 through the communicator 140.

The electronic device 100 may recognize an image displayed on a display 131 to decide a currently used service, and generate history information on the basis of a decision result. For example, the electronic device 100 may be provided with an artificial intelligence system for image recognition. The artificial intelligence system, which is a computer system implementing human-level intelligence, is a system in which a machine performs learning and decision by oneself and a recognition rate is improved as it is used. The image may be recognized a visual understanding technology of recognizing things like human vision among artificial intelligence technologies. The visual understanding is a technology of recognizing and processing things like human vision, and includes object recognition, object tracking, image search, human recognition, scene understanding, space understanding, image improvement, and the like. For example, the electronic device 100 may recognize a broadcasting channel number in the image displayed on the display 131 on the basis of an optical character recognition (OCR)-based visual understanding technology, and obtain a title of a program corresponding to the broadcasting channel number and other additional information related to the program on the basis of EPG information. In addition, the obtained information may be stored in the memory 110. As another example, the electronic device 100 may decide what service is used using an automatic content recognition (ACR) technology of using feature information such as a video or audio fingerprint or a watermark. Meanwhile, the electronic device 100 may transmit a fingerprint, a captured image, or the like, to the external server, and the external server may perform an image recognition operation such as fingerprint matching, OCR, or the like.

The memory 110 stores use history information of the electronic device 100. The stored main information includes a turn on/off time, a watching history (channel, title, program additional information, and the like), an application (YouTube™, Netflix™, or the like) execution history, an input history such as a remote control input, a voice input, or the like, a function use history (menu or the like), and the like, of the electronic device 100, and information on a use point in time is also stored. The stored information may be deleted after a predetermined time.

In addition, the weights W1, W2, and W3 that are to be assigned to the histories are stored in the memory 110. The weights may be periodically updated by reflecting the use patterns that are continuously changed. A task for confirming the weights may be repeated so that the weights may be updated every predetermined period. In detail, the processor 120 may update the weights by querying the server 200 when a periodic update schedule comes.

The memory 110 may include various application programs, data, and software modules for driving and controlling the electronic device 100 by control of the processor 120. For example, the memory 110 may include a history storage/analysis module storing the use history of the service provided by the electronic device 100, a curator module selecting the recommendation service, a service exposure module providing information on the selected recommendation service, a voice recognition module, an image recognition module, and the like.

The processor 120 performs a function of controlling a general operation of the electronic device 100 and a signal flow between internal components of the electronic device 100 and processing data.

The processor 120 includes a random access memory (RAM) 121, a read only memory (ROM) 122, a central processing unit (CPU) 123, and a bus 124. The RAM 121, the ROM 122, the CPU 123, and the like, may be connected to each other through the bus 124. The processor 120 may be implemented by a system on chip (SoC).

The CPU 123 accesses the memory 110 to perform booting using an operating system (O/S) stored in the memory 110. In addition, the CPU 123 performs various operations using various programs, contents, data, and the like, stored in the memory 110.

An instruction set for booting a system, or the like, is stored in the ROM 122. When a turn-on command is input to supply power to the CPU 123, the CPU 123 copies the operating system (O/S) stored in the memory 110 to the RAM 121 depending on an instruction stored in the ROM 122, and executes the O/S to boot the system. When the booting is completed, the CPU 123 copies various application programs stored in the memory 110 to the RAM 121, and executes the application programs copied to the RAM 121 to perform various operations. The processor 120 may perform various operations using the modules stored in the memory 110.

The electronic device 100 may receive a voice input through the microphone 160 embedded in the electronic device 100 or a microphone embedded in an external device and directly recognize the voice or transfer the received voice to an external server performing voice recognition and receive a voice recognition result.

In a case where the electronic device 100 directly performs the voice recognition, the electronic device 100 may be provided with an artificial intelligence system for performing the voice. The artificial intelligence system, which is a computer system implementing human-level intelligence, is a system in which a machine performs learning and decision by oneself and a recognition rate is improved as it is used. The input voice may be recognized through a linguistic understanding technology of recognizing human languages/characters among the artificial intelligence technologies. The linguistic understanding is a technology of recognizing and applying/processing human languages/characters, and includes natural language processing, machine translation, a dialogue system, question and answer, voice recognition/synthesis, and the like.

According to another embodiment, there is a separate external device in which a microphone is embedded, and the external device may perform voice recognition processing on the input voice and provide a voice recognition result to the electronic device 100.

The electronic device 100 may be controlled on the basis of the voice recognition result. For example, when the voice recognition result includes "recommend a channel", the electronic device 100 may select a recommendation channel and provide information on the selected recommendation channel through the output 130.

The output 130 may include the display 131 for outputting an image and a speaker 132 for outputting an audio. The display 131 may be implemented by a liquid crystal display (LCD), a plasma display panel (PDP), an organic light emitting diode (OLED) display, and the like, and may be implemented by a touch screen.

The port 170 is a component for being connected to the external device. The port 170 may include at least one of a high-definition multimedia interface (HDMI) port 171, a component input jack 172, or a universal serial bus (USB) port 173. The port 170 may include at least one of ports such as RGB, DVI, HDMI, DP, Thunderbolt, and the like, in addition to those illustrated in FIG. 8. The information on the recommendation service may be transferred to the external device through the port 170.

Figure 9:
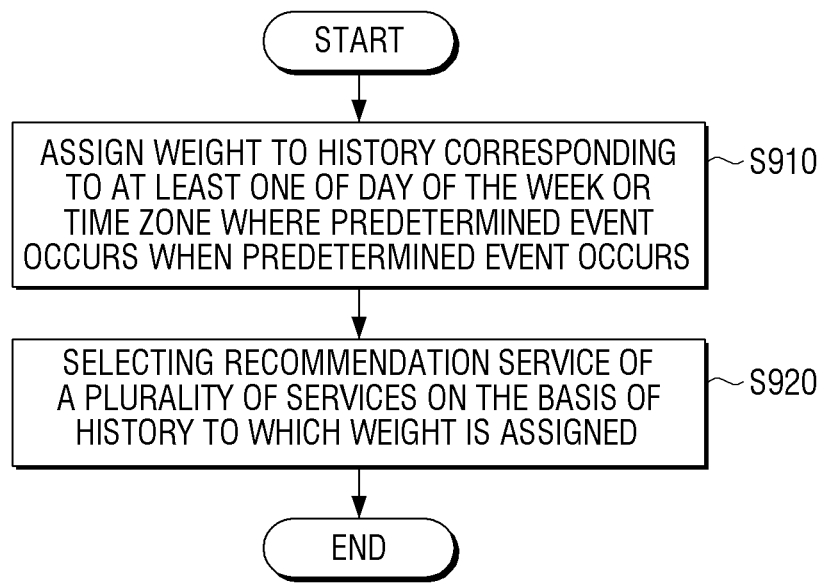
FIG. 9 is a flowchart for describing a method for controlling an electronic device according to an embodiment of the disclosure.

FIG. 9 is a flowchart for describing a method for controlling the electronic device in which history information for each day of the week and each time on each of a plurality of services provided from the electronic device according to an embodiment of the disclosure is stored. The flowchart illustrated in FIG. 9 may include operations processed in the electronic device 100 described in the specification. Therefore, contents described about the electronic device 100 may be applied to the flowchart illustrated in FIG. 9 even though a description for these contents is hereinafter omitted.

Referring to FIG. 9, when the predetermined event occurs, a weight is assigned to a history corresponding to at least one of a day of the week or a time zone where the event occurs among stored histories (S910).

In addition, the electronic device selects a recommendation service of a plurality of services on the basis of the history to which the weight is assigned (S920).

For example, the electronic device may assign a first weight to a history corresponding to the time zone where the event occurs, assign a second weight different from the first weight to a history corresponding to the day of the week where the event occurs, and assign a third weight to a day of the week and a time zone different from the day of the week and the time zone where the event occurs.

The weights may be determined on the basis of service use pattern indices for the plurality of services calculated on the basis of the history information. Therefore, the weight may be updated as the history information is updated.

According to an embodiment, the weight may be determined in the electronic device itself or may be determined through communication with the service 200 clustering the service use pattern indices collected from a plurality of electronic devices. In the latter case, the electronic device 100 may transmit the calculated service use pattern index to the server 200, receive weight information corresponding to a cluster to which the calculated service use pattern index belongs, and determine the weight on the basis of the received weight information. The electronic device 100 may periodically newly calculate the service use pattern index and provide the calculated service use pattern index to the server 200 to periodically update the weight.

The electronic device 100 may calculate use indices of each of the plurality of services on the basis of the weight determined in the manner as described above and use times for each of the plurality of services, and select the recommendation service of the plurality of services on the basis of the calculated use indices. In this case, the use indices of each of the plurality of services may be calculated by applying a reduction value corresponding to a day of the week where a service corresponding to the history is performed.

According to the embodiments of the disclosure described above, main parameters of a model of a local device may be periodically updated through a pattern analysis server, different models need not to be provided for each device because it is based on a clustering model, such that a model configuration is simple, and there is no risk that personal information will be leaked because the history information does not have to be provided to the external server.

Meanwhile, the diverse embodiments described above may be implemented in a computer or a computer-readable recording medium using software, hardware, or a combination of software and hardware. According to a hardware implementation, embodiments described in the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In some cases, embodiments described in the specification may be implemented by the processor 120 itself. According to a software implementation, embodiments such as procedures and functions described in the specification may be implemented by separate software modules. Each of the software modules may perform one or more functions and operations described in the specification.

Meanwhile, computer instructions for performing processing operations in the electronic devices 100 according to the diverse embodiments of the disclosure described above may be stored in a non-transitory computer-readable medium. The computer instructions stored in the non-transitory computer-readable medium allow a specific device to perform the processing operations in the electronic devices 100 according to the diverse embodiments described above when they are executed by a processor of the specific device.

The non-transitory computer-readable medium is not a medium that stores data for a while, such as a register, a cache, a memory, or the like, but means a medium that semi-permanently stores data and is readable by the device. A specific example of the non-transitory computer-readable medium may include a compact disk (CD), a digital versatile disk (DVD), a hard disk, a Blu-ray disk, a universal serial bus (USB), a memory card, a read only memory (ROM), or the like.

According to an embodiment, the methods according to the diverse embodiments disclosed in the disclosure may be included and provided in a computer program product. The computer program product may be traded as a product between a seller and a purchaser. The computer program product may be distributed in a form of a storage medium (for example, a compact disc read only memory (CD-ROM)) that may be read by a device or online through an application store (for example, PlayStore™ or Appstore™). In a case of the online distribution, at least portions of the computer program product may be at least temporarily stored in a storage medium such as a memory of a server of a manufacturer, a server of an application store, or a relay server or be temporarily created.

Although embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

The invention claimed is:

1. An electronic device comprising:
a memory; and
a processor configured to:
store, in the memory, history information of a plurality of services provided from the electronic device,
when a predetermined event occurs, assign:
a first weight to history information of first services among the plurality of services stored in the memory, the first services corresponding to a time zone during which the predetermined event occurred,
a second weight to history information of second services among the plurality of services stored in the memory, the second services corresponding to a day of a week during which the predetermined event occurred, and
a third weight smaller than the first and second weights to history information of third services of the plurality of services stored in the memory, the third services corresponding to a combination of a day of the week and a time zone that is different than a combination of the day of the week and the time zone during which the predetermined event occurred, and
select a service of the plurality of services as a recommended service on the basis of the history information to which the first weight, the second weight, and the third weight is assigned.

2. The electronic device as claimed in claim 1, wherein the processor is configured to:
calculate a use index of each service of the plurality of services on the basis of the first weight, the second weight, and the third weight assigned to the history information of the service and use times for the service, and
select the service of the plurality of services as the recommended service on the basis of the calculated use indices.

3. The electronic device as claimed in claim 2, wherein the processor is configured to:
calculate the use index of each service of the plurality of services by applying, for history information of the service to which the first weight, the second weight, and the third weight is assigned, a reduction value corresponding to a day of the week to which the history information of the service corresponds.

4. The electronic device as claimed in claim 1, wherein the processor is configured to;

calculate a service use pattern index on the basis of the history information stored in the memory, and
determine, on the basis of the calculated service use pattern index, the first weight, the second weight, and the third weight.

5. The electronic device as claimed in claim 4, wherein the processor is configured to:
determine, on the basis of a service use pattern index calculated based on updated history information when the history information is updated, the first weight, the second weight, and the third weight.

6. The electronic device as claimed in claim 4, further comprising:
a communicator configured to communicate with an external server,
wherein the processor is configured to
transmit the calculated service use pattern index to the external server through the communicator,
receive weight information corresponding to a cluster of service use pattern indices to which the calculated service use pattern index belongs from the external server, and
determine, on the basis of the received weight information, the first weight, the second weight, and the third weight.

7. The electronic device as claimed in claim 1, wherein the processor is configured to:
calculate variances for use times of each day of the week for each service of the plurality of services on the basis of the history information of the service and calculate a day-of-the-week pattern index on the basis of the calculated variances for use times of each day of the week,
calculate variances for use times of each time zone for each service of the plurality of services on the basis of the history information of the service and calculate a time pattern index on the basis of the calculated variances for use times of each time zone, and
determine, on the basis of the calculated day-of-the-week pattern index and the calculated time pattern index, the first weight, the second weight, and the third weight.

8. The electronic device as claimed in claim 1, wherein the first weight is larger than the second weight.

9. The electronic device as claimed in claim 1, wherein the processor is configured to:
decide that the predetermined event occurs when a control signal corresponding to a specific button of a remote control device controlling the electronic device is received or a control signal corresponding to a specific voice of a user is received.

10. The electronic device as claimed in claim 1, wherein the plurality of services are a plurality of broadcasting channels, a plurality of applications, or a plurality of contents.

11. The electronic device as claimed in claim 2, wherein the second weight is smaller than the first weight.

12. A method comprising:
when a predetermined event occurs, assigning:
a first weight to history information of first services among a plurality of services provided from an electronic device, the first services corresponding to a time zone during which the predetermined event occurred,
a second weight to history information of second services among the plurality of services, the second services corresponding to a day of a week during which the predetermined event occurred, and a third weight smaller than the first and second weights to history information of third services of the plurality of services, the third services corresponding to a combination of a day of the week and a time zone that is different than a combination of the day of the week and the time zone during which the predetermined event occurred, and selecting a service of the plurality of services as a recommended service on the basis of the history information to which the first weight, the second weight, and the third weight is assigned.

13. The method as claimed in claim 12, further comprising:

calculating a use index of each service of the plurality of services on the basis of the first weight, the second weight, and the third weight assigned to history information of the service and use times for the service, and selecting the service of the plurality of services as the recommended service on the basis of the calculated use indices.

14. The method as claimed in claim 13, wherein the use index of each service of the plurality of services is calculated by applying, for history information of the service to which the first weight, the second weight, and the third weight is assigned, a reduction value corresponding to a day of the week to which the history information of the service corresponds.

15. The method as in claim 12, wherein the second weight is smaller than the first weight.

* * * * *